US012170180B2

(12) United States Patent
Mannekutla et al.

(10) Patent No.: US 12,170,180 B2
(45) Date of Patent: Dec. 17, 2024

(54) THREE-PHASE ARC QUENCHING DEVICE OPERATED BY ONE ACTUATOR

(71) Applicant: ABB Schweiz AG, Baden (CH)

(72) Inventors: James Mannekutla, Västerås (SE); Elisabeth Lindell, Västerås (SE); Ola Jeppsson, Västerås (SE)

(73) Assignee: ABB Schweiz AG, Baden (CH)

( * ) Notice: Subject to any disclaimer, the term of this patent is extended or adjusted under 35 U.S.C. 154(b) by 113 days.

(21) Appl. No.: 18/064,567

(22) Filed: Dec. 12, 2022

(65) Prior Publication Data

US 2023/0197381 A1 Jun. 22, 2023

(30) Foreign Application Priority Data

Dec. 17, 2021 (EP) .................................... 21215585

(51) Int. Cl.
*H01H 39/00* (2006.01)

(52) U.S. Cl.
CPC ................................ *H01H 39/004* (2013.01)

(58) Field of Classification Search
CPC .... H01H 75/00; H01H 77/00; H01H 2033/00; H01H 2033/02; H01H 2033/42; H01H 2033/664; H01H 2033/666; H01H 39/00; H01H 39/004; H01H 1/36; H01H 15/00; H01H 15/10; H01H 15/16
USPC ...................................................... 200/61.08
See application file for complete search history.

(56) References Cited

U.S. PATENT DOCUMENTS

| | | | | |
|---|---|---|---|---|
| 9,418,807 | B2 | 8/2016 | Marlin et al. | |
| 9,800,046 | B2 | 10/2017 | Doréet al. | |
| 10,153,120 | B1 | 12/2018 | Doréet al. | |
| 10,236,148 | B2 | 3/2019 | Lell | |
| 2015/0206681 | A1 | 7/2015 | Marlin et al. | |
| 2015/0248979 | A1* | 9/2015 | Parks | H01H 39/004 200/61.08 |

FOREIGN PATENT DOCUMENTS

| | | | |
|---|---|---|---|
| DE | 19712387 | A1 | 10/1997 |
| DE | 10254497 | B3 | 6/2004 |
| DE | 102011113955 | A1 | 3/2012 |
| EP | 3696842 | A1 | 8/2020 |
| FR | 2953322 | A1 | 6/2011 |
| WO | 9619816 | A1 | 6/1996 |

OTHER PUBLICATIONS

Extended European Search Report; Application No. 21215585. 7; Completed: May 20, 2022; Issued: May 31, 2022; 6 Pages.
European Office Action; Application No. 21215585.7; Completed Mar. 19, 2024; 4 Pages.

* cited by examiner

*Primary Examiner* — Anthony R Jimenez
(74) *Attorney, Agent, or Firm* — Whitmyer IP Group LLC

(57) ABSTRACT

An arc quenching device for a three-phase electrical switchgear. The device includes a first busbar, a second busbar and a third busbar, each of a respective phase of the three-phase switchgear. The device also includes at least one piston of an electrically conductive material and having a tapered shape, tapering towards its front end. The device also includes only one pyrotechnical actuator arranged to, when the pyrotechnical actuator is fired, axially move each of the at least one piston until all of the first, second and third busbars are short-circuited to each other via the at least one piston.

17 Claims, 4 Drawing Sheets

THREE-PHASE ARC QUENCHING DEVICE OPERATED BY ONE ACTUATOR

TECHNICAL FIELD

The present disclosure relates to an arc quenching device for a three-phase electrical switchgear.

BACKGROUND

In a switchgear, an arc event, even for a relatively short duration, can result in major damages. An arc can be quenched by short circuiting all phases, to each other (and optionally to ground). To protect switchgear components and avoid damages, the duration of the arc should be reduced. A circuit breaker can interrupt fault currents arising from internal arcs. However, the opening time of the circuit breaker may be relatively long, e.g. 30 to 60 ms. For faster arc quenching, e.g. within 2 ms of arc detection, a pyrotechnical actuator may be used.

EP 3 696 842 discloses a single-phase electrical closing switch for grounding one phase using a pyrotechnical actuator to drive a movable piston to electrically connect both a phase electrode and a ground electrode.

SUMMARY

It is an objective of the present invention to provide an arc quenching device for a three-phase electrical switchgear using only one pyrotechnical actuator.

According to an aspect of the present invention, there is provided an arc quenching device for a three-phase electrical switchgear. The device comprises a first busbar, a second busbar and a third busbar, each busbar of a respective phase of the three-phase switchgear. The device also comprises at least one piston of an electrically conductive material and having a tapered shape, tapering towards the front end of the piston. The device also comprises only one pyrotechnical actuator arranged to, when the pyrotechnical actuator is fired, axially move each of the at least one piston until all of the first, second and third busbars are short-circuited to each other via the at least one piston.

According to another aspect of the present invention, there is provided a three-phase electrical switchgear comprising an embodiment of the arc quenching device of the present disclosure and a fault clearing breaker arranged to break a current of each of the three phases to which the first, second and third busbars, respectively, are connected.

By using only one pyrotechnical actuator for short-circuiting all the three phases by means of at least one (e.g., one, two or three) piston, the complexity and cost of the arc quenching device may be reduced. Also, by using only one pyrotechnical actuator, there is no need to synchronize firing of a plurality of pyrotechnical actuators.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
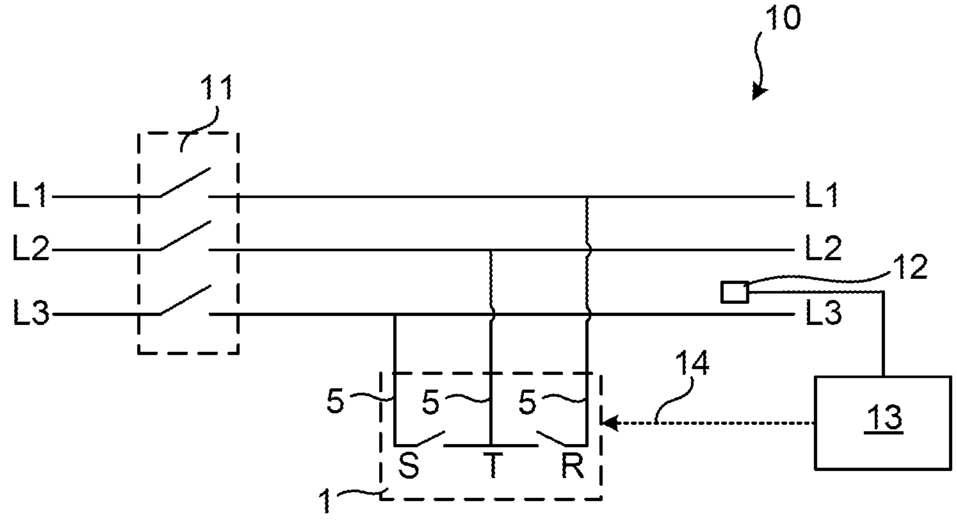
FIG. 1 is a schematic circuit diagram of a three-phase switchgear comprising an arc quenching device, in accordance with some embodiments of the present invention.

FIG. 1 illustrates a three-phase electrical switchgear 10 comprising a breaker 11, e.g. a fault clearing breaker, arranged to break the current of each of the three phases/phase lines L1, L2 and L3. The switchgear 10 may e.g. be arranged to break the current to a load, in which case the switchgear may be arranged between a power distribution system, at a line side of the switchgear, and at least one load, at a load side of the switchgear. The switchgear may be arranged for low or medium voltage applications, implying that the Alternating Current (AC) phase-to-phase voltage of the phases L1, L2 and L3 is within the medium or low voltage range, e.g. within the range of 0.1-50 kV, or within the low voltage range of 0.1-1 kV.

The breaker 11 may typically be able to clear an arc fault, i.e. to break the current in the phases L1, L2 and L3, within a time range of 30-60 ms after detection of the arc fault. This may be too slow to avoid damages resulting from the arc fault. For faster quenching of an arc, the arc quenching device 1 is arranged in the switchgear 10 and able to short-circuit all the phases L1, L2 and L3 much faster, e.g. within a time range of 0.1-5 ms, preferably 0.1-2 ms, after detection of an arc. The arc quenching device 1 is connected to each of the phases L1, L2 and L3 of the switchgear via electrical conductors. Specifically, the device 1 comprises phase busbars 5 (herein also called busbars) electrically connected to the phase lines of the switchgear 10. In the examples presented herein, the three busbars 5, which are each connected to phase L1, L2 or L3, respectively denoted first busbar T, second busbar S and third busbar R. The arc quenching device 1 is configured to quench an arc by short-circuiting all the three busbars T, S and R, to each other (and optionally also to ground), thus short-circuiting the three phases L1, L2 and L3 to each other.

To detect an arc fault, the switchgear 10 comprises an arc fault detector 13 connected to an arc fault sensor 12, e.g. an optical, current, pressure and/or heat sensor configured to detect an electrical arc in the switchgear, e.g. between two of the phases L1, L2 and L3, between a phase and ground, or generally within the switchgear 10. When the arc fault detector 13 detects an arc via the sensor 12, the detector 13 sends a firing signal 14 to the arc quenching device 1, causing the at least one pyrotechnical actuator 3 (see FIG. 2) of the device 1 to fire.

Figure 2:
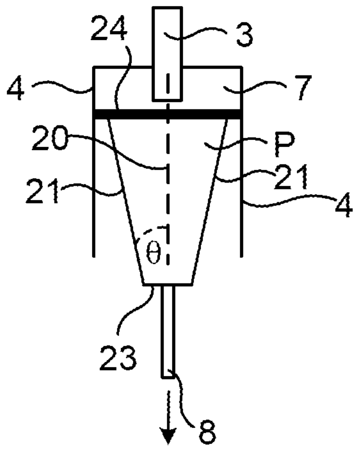
FIG. 2 is a schematic view in longitudinal section of a piston arranged together with the pyrotechnical actuator, in accordance with some embodiments of the present invention.

FIG. 2 illustrates a piston P arranged with a pyrotechnical actuator 3, which may be used in an arc quenching device 1, e.g. in any of the embodiments illustrated in FIGS. 3-6.

The piston P has a back end 24 facing away from the direction of the axial movement as indicated by the down-pointing arrow in FIG. 2, a front end 23 facing in the direction of said axial movement, and a lateral surface 21. What is discussed about the piston P shown in FIG. 2 is also valid for any other piston P of the device 1.

The piston P, especially its lateral surface 21, is of an electrically conductive material, enabling the piston to short-circuit the busbars 5 via the piston by the lateral surface 21 of the piston making electrical contact with the busbars 5. The piston P may typically have a circular cross-section. The piston is arranged with a pyrotechnical actuator 3 which, when fired, forms an expanding gas which pushes the, previously stationary, piston P along its longitudinal axis 20 in a direction away from the actuator 3 (in the direction indicated by the axial arrow in the figure, below the piston).

Figure 3A:
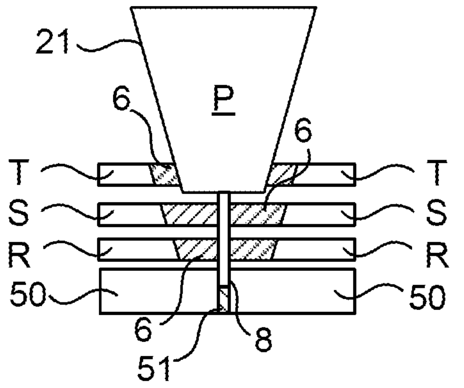
FIG. 3*a* is a schematic view in longitudinal section of a piston arranged in an open position in relation to the first, second and third busbars of an arc quenching device, in accordance with some embodiments of the present invention.
Figure 3B:
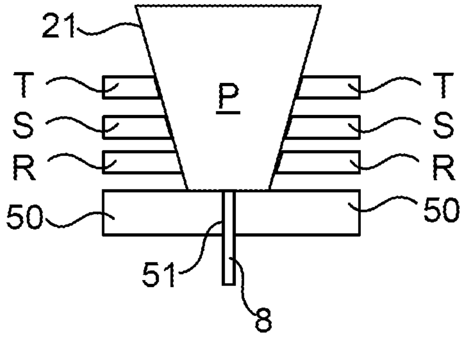
FIG. 3*b* is a schematic view in longitudinal section of the piston of FIG. 3*a* but in a closed position in relation to the first, second and third busbars, in accordance with some embodiments of the present invention.
Figure 4:
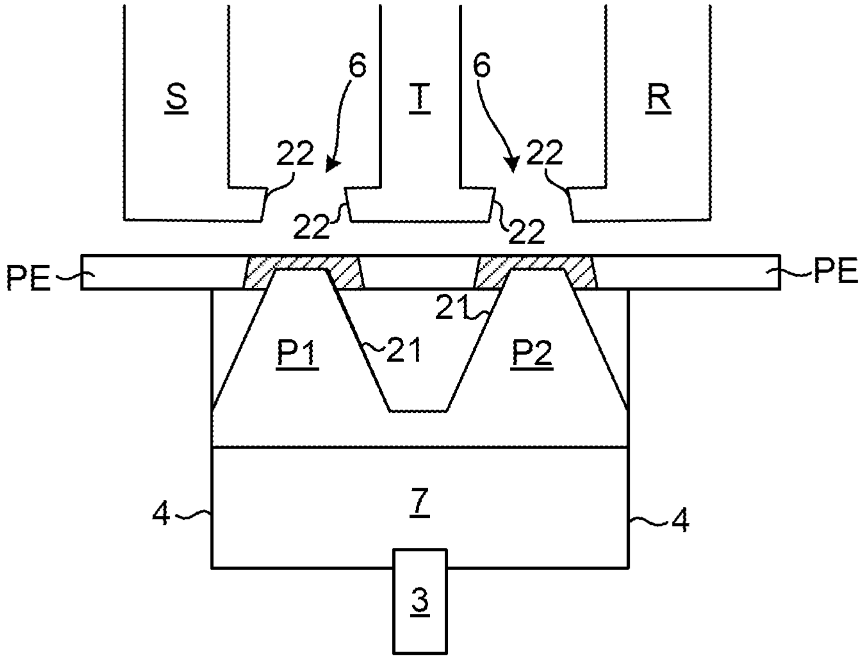
FIG. 4 is a schematic view in longitudinal section of an arc quenching device, showing first and second pistons arranged in open positions in relation to the first, second and third busbars, and also to a protective earth busbar, in accordance with some other embodiments of the present invention.
Figure 5A:
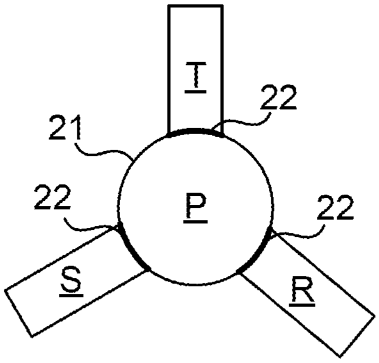
FIG. 5*a* is a schematic top view of a piston arranged in a closed position in relation to the first, second and third busbars of an arc quenching device, in accordance with some embodiments of the present invention.
Figure 5B:
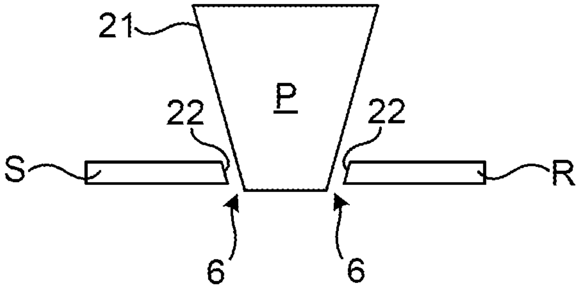
FIG. 5*b* is a schematic side view of the piston in FIG. 5*a*, but in an open position in relation to the first, second and third busbars (where the first busbar is hidden behind the piston) of an arc quenching device, in accordance with some embodiments of the present invention.
Figure 5C:
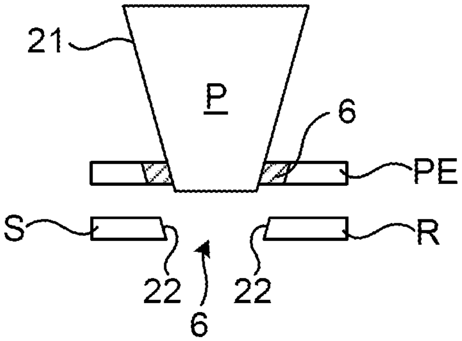
FIG. 5*c* is a schematic side view of a piston (similar to FIG. 5*b*) in an open position in relation to the first, second and third busbars, and also to a protective earth busbar, of an arc quenching device, in accordance with some embodiments of the present invention.
Figure 6A:
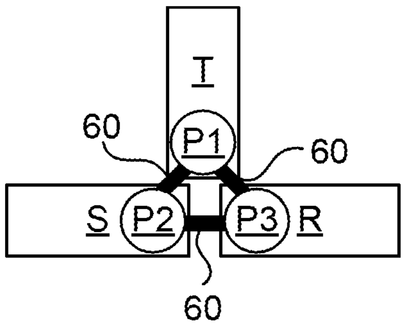
FIG. 6*a* is a schematic top view of three pistons which are mechanically and electrically connected to each other and arranged in relation to the first, second and third busbars of an arc quenching device, in accordance with some embodiments of the present invention.
Figure 6B:
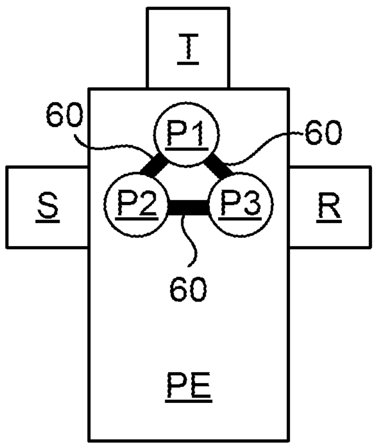
FIG. 6*b* is a schematic top view of three pistons which are mechanically and electrically connected to each other (similar to FIG. 6*a*) and arranged in relation to the first, second and third busbars, and also to a protective earth busbar, of an arc quenching device, in accordance with some embodiments of the present invention.

The actuator 3 is arranged to axially move the piston P from its open position, e.g. as illustrated in FIG. 3*a*, to its closed position, e.g. as illustrated in FIG. 3*b*, through an opening 6 (e.g., as in any of the FIGS. 4, 5*b* and 6*a*), or a plurality of axially arranged openings 6 (e.g., as in the examples of FIGS. 3, 5*c* and 6*b*). The opening 6, or each of the openings 6, may be a hole, through hole or blind hole, in a busbar 5, or an opening between different, and from each other electrically isolated, busbars 5, e.g. the busbars T, S and R of the following FIGS. 3-6.

To facilitate causing the axial movement of the piston P by the actuator 3 when firing, a housing 4 may be arranged around the piston P, providing a sealed-off chamber 7 between the back end 24 of the piston P and the inside of the housing 4, preferably during the whole axial movement of the piston. Thus, when the actuator 3 fires, gas may be formed within the chamber 7 which pushes on the back end 24 of the piston P, axially moving the piston and expanding the chamber 7.

Additionally, or alternatively, the actuator may itself comprise a moving part which, when the pyrotechnical actuator is fired, is axially pressed against the piston P, in physical contact therewith, to cause the axial movement of the piston. In this case, the gas expansion may occur in a chamber within the actuator 3 rather than in a chamber 7 between the actuator 3 and the back end 24 of the piston P.

Preferably, the piston P has a tapered shape, tapering towards the front end 23 of the piston, e.g. at an angle θ to the longitudinal axis 20 within the range of 3-12°, preferably 4-8°, e.g. 5.5-6.5°. This allows the piston P to be wedged in the opening(s) 6, said opening(s) typically having a size and shape corresponding to the tapered shape of the piston, at its closed position at the end of its axial movement, improving the electrical connection between the piston P and the busbars 5. Preferably, the piston has a conical shape, e.g. a truncated or frustoconical shape as in the figures. A conical piston typically has a circular base, forming an end surface of the back end 24 of the piston. Typically, the cone is right circular. In a right circular cone piston P, truncated or not, the angle θ between a generatrix line of the lateral surface 21 and the central longitudinal axis 20 may thus be within the range of 3-12°, preferably 4-8°, e.g. 5.5-6.5°.

Preferably, the inner surfaces of the opening(s) 6 are arranged to fit against the tapered shape of the piston P, for improved electrical connection. If the opening 6 is a hole in a busbar 5, the hole may be tapered, with the same angle θ to the longitudinal axis 20 as the piston P to fit against the lateral surface 21 at the end of the axial movement of the piston (corresponding to the closed position of the piston P and a closed state of the device 1). Additionally, or alternatively, the hole 6 has a shape (typically circular) and size (in a plane perpendicular to the longitudinal axis 20) which correspond to a cross-section of the piston such that, when the piston has reached its closed position, the inside surface of the hole contacts the lateral surface 21 of the piston around the whole circumference of the piston.

Similarly, if the opening 6 is between two or more busbars 5, each of the respective end surfaces 22 (see e.g., FIG. 4 or FIG. 5*b*) of the busbars may slant with the same angle θ to the axis 20 as the piston P to fit against the lateral surface 21 at the end of the axial movement of the piston (corresponding to the closed position of the piston P and a closed state of the device 1). Additionally, or alternatively, each of the respective end surfaces 22 (see e.g., FIG. 5*a*) of the busbars 5 may be curved in the plane perpendicular to the longitudinal axis 20 to continuously contact around a section of the circumference of the piston when it has reached its closed position.

To guide the piston P into and/or through the opening 6, or plurality of axially arranged openings 6, the piston may be provided with a guide 8 (see also FIGS. 3*a* and 3*b*) which is axially extending from the front end 23 of the piston. The guide 8 is of an electrically insulating material. The guide 8 is typically cylindrical, e.g. with a circular cross-section.

The arc quenching device 1 comprises at least one piston P. In some embodiments, e.g. as exemplified in FIGS. 3 and 5, the at least one piston P consists of only one piston. In some other embodiments, e.g. as exemplified in FIG. 4 (with two pistons P1 and P2) and FIG. 6 (with three pistons P1, P2 and P3), the at least one piston P consists of a plurality of pistons, e.g. two or three pistons.

Regardless of the number of pistons P in the arc quenching device 1, only one pyrotechnical actuator 3 is used in the device 1, for axially moving all of the at least one pistons. To facilitate a plurality of pistons P to be moved by a single actuator 3, and for ensuring that the pistons move simultaneously, all the pistons may conveniently be rigidly mechanically connected to each other such that they do not move in relation to each other when they are axially moved by the actuator 3. Thus, a rigid mechanical connection 60 (see FIGS. 4 and 6) may be arranged between the pistons P to immobilize the pistons in relation to each other even when they are together moved axially by the actuator 3.

Additionally, since all the three phases can be short-circuited by the at least one piston P, when a plurality of pistons are used, the pistons are preferably electrically connected to each other, e.g. by the connection 60 (see FIGS. 6*a* and 6*b*) being of an electrically conductive material and thus also providing an electrical connection between the pistons. Thus, in some embodiments, all of the pistons P are electrically connected to each other such that the first, second and third busbars T, S and R are short-circuited to each other via said electrical connection 60 after the axial movement of the pistons.

When the arc quenching device 1 is open, each of the at least one piston Pis in its open position where all of the three busbars T, S and R, are electrically insulated from each other at the opening(s) 6, e.g. by an electrically insulating gas in the opening(s) 6, such as air or by another electrically insulating gas/gas mixture, for instance (pure) nitrogen.

When the pyrotechnical actuator 3 is fired, all of the at least one piston P simultaneously move axially until they each reach its closed position, closing the arc quenching device 1. In its closed position, all of the first, second and third busbars T, S and R, are in physical (and thus electrical) contact at least one of the at least one piston P, typically via its electrically conductive lateral surface 21.

FIGS. 3*a* and 3*b* illustrate open and closed positions, respectively, of a piston P of the arc quenching device 1, in this example a device 1 with only one piston P. In FIG. 3*a*, the piston P is in its open position, and the device 1 is in an open state, while in FIG. 3*b*, the piston is in its closed position, and the device 1 is in a closed state, where the lateral surface 21 of the piston P is in electrical contact with all the three phases T, S and R, short-circuiting all the phases to each other.

The single piston P is arranged to axially move through respective axially aligned holes 6 through each of the three busbars T, S and R forming three layers of busbars. It follows that, in its closed position, the piston Pis in physical (and thus electrical) contact with each of the first, second and third busbars T, S and R. Specifically, the lateral surface 21 of the piston P is in physical contact with the inside surface of the hole 6 through the first busbar T, with the inside surface of the hole 6 through the second busbar S and with the inside surface of the hole 6 through the third busbar R.

Thus, in some embodiments of the present invention, the device 1 is arranged such that, after the axial movement of the piston P, the lateral surface 21 of the piston contacts respective inner surfaces of a hole 6 in the first busbar T, a hole 6 in the second busbar S, and a hole 6 in the third busbar R.

As mentioned in relation to FIG. 2, the piston P may be provided with a guide 8 of an electrically insulating material, to aid the piston to pass through the openings 6. This may be especially advantageous in case, as in FIGS. 3, the piston is arranged to electrically contact busbars of more than two axially aligned openings 6. The guide 8 may then ensure that the piston makes physical and electrical contact with all the busbars it is arranged to contact at its closed position at the same time. If a piston P contacts only two busbars, e.g. T and S in FIGS. 3, there is a risk that the piston is delayed or prevented from making contact with all the busbars it is arranged to contact at its closed position, e.g. by welding taking place to the two first contacted busbars.

To ensure controlled straight axial movement of a piston P as it is axially moved by the actuator 3, the guide 8 of the piston may be arranged to pass through a guide hole 51 in an insulator 50 of an electrically insulating material, arranged on the other side of the openings 6 as seen in the direction of the axial movement of the piston. For instance, the front end of the guide 8 may extend into its guide hole 51 of the insulator 50 when the piston is in its open position, and may then then pass further into or through the guide hole during the axial movement until the piston has reached its closed position. Thus, the piston may be prevented from moving at an angle to the longitudinal axis 20, or from tilting, during its axial movement.

Optionally, a Protective Earth (PE) busbar may be added as a forth layer of busbars. The PE busbar may then similarly have a through hole 6 which is axially aligned with the holes 6 of the phase busbars T, S and R, such that the lateral surface 21 of the piston P makes electrical contact also with an inner surface of the hole 6 through the PE busbar when it is in its closed position. A PE busbar may be used, or not, with any of the embodiments of the device 1, depending on whether it is desired to short-circuit the phases L1, L2 and L3 also to ground.

Thus, in some embodiments of the present invention, the arc quenching device 1 may further comprise a protective earth busbar PE arranged such that, when the pyrotechnical actuator 3 is fired, each of the at least one piston P is axially moved until each of the at least one piston contacts the protective earth busbar such that each of the first, second and third busbars T, S and R, are also short-circuited to the protective earth busbar via the at least one piston.

FIG. 4 illustrates an example of an embodiment where the at least one piston consists of two pistons, a first piston P1 and a second piston P2 and the actuator 3 is used to enable axial movement of both pistons P1 and P2. The first and second pistons P1 and P2 are rigidly mechanically connected to each other and are arranged to axially move together (upwards in the figure) driven by the single actuator 3 to contact the first, second and third busbars T, S and R via end surfaces 22 thereof, optionally through first and second through holes 6 of a PE busbar. The end surfaces 22, as well as the through holes 6, may be as discussed herein.

FIG. 5*a* illustrates an embodiment, seen from above, in which a single piston P is able to short-circuit all the three phases via respective end surfaces 22 of the busbars T, S and R. The tapered shape of the piston P enables the lateral surface 21 thereof to come into contact with the end surfaces 22 of the stationary busbars by means of the axial movement of the piston.

FIG. 5*b* shows the same embodiments as in FIG. 5*a*, but from the side and with the first busbar T hidden behind the piston P.

FIG. 5*c* illustrates an embodiment which is similar to the embodiment of FIGS. 5*a* and 5*b* but with also a PE busbar. The PE busbar may be arranged as a second layer of busbars, which a hole 6 in the PE busbar axially aligned with the opening 6 formed between the end surfaces 22 of the phase busbars T, S and R. Alternatively, the PE busbar could be arranged in the same plane as the phase busbars, with an end surface 22 of the PE busbar at the opening 6 formed between the end surfaces 22 of the phase busbars such that also the end surface 22 of the PE busbar is in electrical contact with the lateral surface 21 of the piston P in its closed position.

Thus, in some embodiments of the present invention, the device 1 is arranged such that, after the axial movement of the piston P, the lateral surface 21 of the piston contacts respective end surfaces 22 of the first busbar T, the second busbar S, and the third busbar R, and optionally of a PE busbar.

FIGS. 6*a* and 6*b* illustrate embodiments in which the at least one piston P consists of three pistons, a first piston P1, an second piston P2 and a third piston P3, corresponding to one piston per phase.

FIG. 6*a* illustrates an embodiment without a PE busbar, where each of the three pistons is arranged to contact only one respective of the three phase busbars T, S and R, e.g. via a through hole or blind hole 6 in the busbar, when the pistons are in their closed positions. The phases are then short-circuited to each other via the electrical connections 60 between the pistons.

FIG. 6*b* illustrates a similar embodiment as FIG. 6*a* but with also a PE busbar. In the embodiment of the figure, the PE busbar is arranged as a separate layer and having a respective through hole 6 for each of the three pistons P1, P2 and P3. For each piston, its through hole in the PE busbar is axially aligned with through hole or blind hole 6 in the phase busbar it is arranged to contact. Thus, when the pistons are in their closed positions, each piston is in electrical contact with both a respective one of the phase busbars and with the PE busbar. Alternatively, only one or two of the three pistons may be arranged to electrically contact the PE busbar when in its closed position. Then, all phases would still be short-circuited to ground via the electrical connection 60 between the pistons, but possibly not as well.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An arc quenching device for a three-phase electrical switchgear, the device comprising:

a first busbar, a second busbar and a third busbar, each of a respective phase of the three-phase switchgear;

at least one piston of an electrically conductive material and having a tapered shape, tapering towards its front end; and only one pyrotechnical actuator arranged to, when the pyrotechnical actuator is fired, axially move each of the at least one piston until all of the first, second and third busbars are short-circuited to each other via the at least one piston; and a protective earth busbar arranged such that, when the pyrotechnical actuator is fired, each of the at least one piston is axially moved until each of the at least one piston contacts the protective earth busbar such that each of the first, second and third busbars are also short-circuited to the protective earth busbar via the at least one piston.

2. The arc quenching device of claim 1, wherein each of the at least one piston is provided with a guide of an electrically insulating material which is axially extending from the front end of the piston.

3. The arc quenching device of claim 1, wherein the at least one piston comprises a plurality of pistons, all mechanically connected to each other such that they do not move in relation to each other when they are axially moved by the actuator.

4. The arc quenching device of claim 3, wherein all of the pistons are electrically connected to each other such that the first, second and third busbars are short-circuited to each other via said electrical connection after the axial movement of the pistons.

5. The arc quenching device of claim 1, wherein the tapered shape is a conical shape.

6. The arc quenching device of claim 5, wherein the conical shape is a frustoconical shape.

7. The arc quenching device of claim 1, wherein the tapered shape tapers at an angle to a longitudinal axis of the at least one piston within a range of 3-12°.

8. The arc quenching device of claim 7, wherein the angle at which the tapered shape tapers is within a range of 5.5-6.5°.

9. The arc quenching device of claim 1, wherein the at least one piston consists of only one piston.

10. The arc quenching device of claim 9, wherein the device is arranged such that, after the axial movement of the at least one piston, a lateral surface of the piston contacts respective inner surfaces of a hole in the first busbar, a hole in the second busbar, and a hole in the third busbar.

11. The arc quenching device of claim 9, wherein the tapered shape is a conical shape.

12. The arc quenching device of claim 9, wherein each of the at least one piston is provided with a guide of an electrically insulating material which is axially extending from the front end of the piston.

13. The arc quenching device of claim 9, wherein the tapered shape tapers at an angle to a longitudinal axis of the at least one piston within a range of 3-12°.

14. The arc quenching device of claim 9, wherein the device is arranged such that, after the axial movement of the at least one piston, a lateral surface of the at least one piston contacts respective end surfaces of the first busbar, the second busbar, and the third busbar.

15. The arc quenching device of claim 14, wherein each of the end surfaces of the first, second and third busbars is curved to fit against the lateral surface of the at least one piston with which it is arranged to make contact.

16. A three-phase electrical switchgear comprising:

an arc quenching device, having:

a first busbar, a second busbar and a third busbar, each of a respective phase of the three-phase switchgear;

at least one piston of an electrically conductive material and having a tapered shape, tapering towards its front end;

only one pyrotechnical actuator arranged to, when the pyrotechnical actuator is fired, axially move each of the at least one piston until all of the first, second and third busbars are short-circuited to each other via the at least one piston; and a fault clearing breaker arranged to break a current of each of the three phases to which the first, second and third busbars, respectively, are connected.

17. The three-phase electrical switchgear of claim 16, arranged for low or medium voltage applications.

* * * * *